United States Patent [19]

Treanor

[11] Patent Number: 4,479,880
[45] Date of Patent: Oct. 30, 1984

[54] METHOD AND APPARATUS FOR DEFLECTING GRANULAR MATERIAL AWAY FROM THE OUTLET OF A FILTRATION BED

[75] Inventor: Anthony I. J. Treanor, Heston, England

[73] Assignee: Permutit-Boby Limited, Whitchurch, England

[21] Appl. No.: 484,821

[22] Filed: Apr. 13, 1983

[30] Foreign Application Priority Data

Apr. 21, 1982 [GB] United Kingdom ............... 8211493

[51] Int. Cl.³ ............................................. B01D 23/24
[52] U.S. Cl. .................................. 210/795; 210/274; 210/275
[58] Field of Search ............ 210/792, 793, 794, 795, 210/274, 305, 306, 521, 275, 279

[56] References Cited

U.S. PATENT DOCUMENTS

| 798,473 | 8/1905 | Wilson | 210/275 |
|---|---|---|---|
| 1,069,737 | 8/1913 | Stevenson | 210/794 |
| 3,313,420 | 4/1967 | Hirsch | 210/275 |
| 3,925,202 | 12/1975 | Hirs | 210/795 |
| 4,322,299 | 3/1982 | Scholten et al. | 210/794 |
| 4,338,202 | 7/1982 | Louboutin | 210/795 |

FOREIGN PATENT DOCUMENTS 578205  6/1946  United Kingdom ............... 210/521

Primary Examiner—Richard V. Fisher
Assistant Examiner—John W. Czaja
Attorney, Agent, or Firm—Lawrence Rosen

[57] ABSTRACT

A liquid is filtered through a bed 7 of granular material and cleaning of the bed is conducted, when necessary, by upflow of wash water through orifices 9 and air through orifices 12 positioned mid-way between the orifices 9. An overflow 13 defines a free water space 15 above the bed and a baffle formed of elements 18, 19 and 20 surrounds the overflow outlet. During cleaning the wash water and air flow upwardly at rates such that some granular material is entrained by upflowing air bubbles and could be carried to the overflow 13 but substantially all the entrained granular material is separated from the entraining air bubbles at or near the top of the free space 15.

15 Claims, 3 Drawing Figures

4,479,880

METHOD AND APPARATUS FOR DEFLECTING GRANULAR MATERIAL AWAY FROM THE OUTLET OF A FILTRATION BED

FIELD OF THE INVENTION

Water may be filtered by passage through a filter bed of grandular material, whereupon dirt in the water is trapped in or on the filter bed. It is necessary to clean the bed from time to time and this is normally done by back washing with water. Service flow is normally downflow in which event back washing is upflow. The waste wash water is removed through an outlet above the top of the bed. The space between the top of the bed and the outlet may be termed the free water space.

DESCRIPTION OF THE PRIOR ART

It is known to attempt to improve the cleaning by air scouring, i.e. by passing an air stream through the bed in the same direction as the back washing stream. Air scouring may sometimes be performed before water back washing but for most beneficial results should be performed at the same time as water back washing. Its purpose is to cause the filter media grains to rub against each other so that the adhering dirt is abraded and separated from the grains and washed out of the bed by the back wash water.

For optimum effectiveness in this action the air bubbles should be large and bouyant relative to the grains of filter media. Under these conditions as the upwardly flowing air bubbles disengage from the surface of the filter bed they tend to lift individual grains of filter media into the free water space above the bed and to carry them towards and out through the backwash waste outlet along with the dirt removed from the bed.

In order to prevent the loss of granular material it is normal practice to make the free water space sufficiently deep that substantially no granular material is carried to the top of it. This substantially prevents the loss of grandular material but it does incur a serious disadvantage. The dirt that is being washed from the bed tends to be recycled within the free water space, instead of being washed out through the outlet, and so, unless the back wash is continued for a very long period of time, with considerable wastage of wash water, as soon as the filter is returned to service the remaining dirt is re-deposited onto or within the filter bed.

The problem of dirt recycling is particularly serious where the dirt being removed from the filter bed consists of material of relatively high specific gravity or consists of flocculated material with a high gravitational settling velocity since, although the eject velocity of the dirt particles from the surface pores of the filter bed may be high, the upward water velocity in the free water space above the bed is only a fraction of the upward velocity of the back wash water within pores of the filter bed.

In order to minimise dirt recyclings and thus to ensure effective cleaning of the filter bed in the shortest possible time and with minimum consumption of wash water, it is essential that the depth of the water space between the top of the filter bed and the waste back wash water collection and removal system is such that the residence time in the free water space is insufficient to permit the effect of gravitational sedimentation to cause deacceleration of the upwardly ejected dirt particles to the point at which they begin to resettle and recycle. However a consequence of reducing the depth of the free water space so as to minimise dirt recycling is that there is then increased tendency for filter grains to be lost through the outlet. The need to avoid loss of filter media through the outlet during air scour while avoiding dirt recycling presents a serious problem. In many filters designed for cleaning by simultaneous air scour and back wash, efficiency of cleaning, conservation of wash water, outage time and filtration capacity are sacrificed because this problem has not been resolved.

A typical instance when this problem arises is when a filter bed is cleaned by the technique described in the paper of Treanor and Smith entitled "Varivoid Filters in Use and Reuse Schemes" delivered to the 40 th Annual Meeting International Water Conference of the Engineers Society of Western Pennsylvania in 1979. "Varivoid" is a trade mark. It is described in that paper that Varivoid cleaning involves a first cleaning stage, a second cleaning stage consisting of combined air scour and back wash with the air being introduced through a separate bottom distribution system and with the water rate below the minimum fluidisation velocity but the upward linear velocity of the air/water mixture above the minimum fluidisation velocity, and a final stage consisting of a sub-fluidisation wash without air. A similar system is also described in a paper entitled "Water Flood — Filtration of Water for Oil Well Injection" by A. I. Treanor and published by Permutit-Body Limited. Attempts to operate the systems as described and illustrated in these papers using conventional techniques inevitably results either in considerable loss of granular material or significant retention of dirt.

SUMMARY OF THE INVENTION

In the invention a liquid is filtered through a filter bed of granular material in a vessel and is cleaned in the vessel and the vessel has an outlet for wash water above the top of the bed, thereby defining a free water space above the bed, and cleaning is effected by upflow of wash water and air at rates such that some granular material is entrained by upflowing air bubbles and could be carried to the top of the free water space and substantially all the entrained granular material is separated from the bubbles at or near the top of the free water space and allowed to fall back onto the bed. Thus in the invention the free water space is sufficiently shallow that entrained granular material is capable of being carried to the top of it and loss of this granular material is prevented by separation of the granular material from the air bubbles at or near the top of the free water space.

The separation is preferably promoted by providing one or more baffles in the free water space adjacent the outlet, the baffles preferably being constructed such that the entrained granular material strikes the baffles and the granular material is therby separated from the entraining air bubbles. Best results are obtained when a particular construction of baffle is provided below the level of the outlet and surrounding the outlet. Apparatus including such a baffle forms a further feature of the invention.

BRIEF DESCRIPTION OF THE DRAWINGS

Apparatus according to the present invention is illustrated in the accompanying drawings wherein.

DETAILED DESCRIPTION OF THE INVENTION

Figure 1:
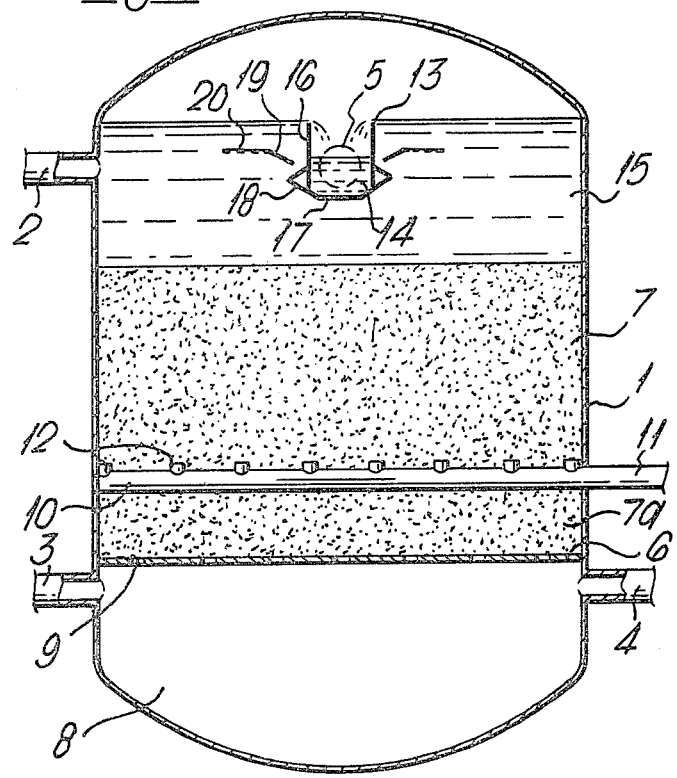
FIGS. 1 and 2 are diagrammatic sectional views of filter vessels according to the invention.

Novel apparatus according to the invention therefore comprises a vessel in which a filter bed granular material may be contained, inlets for air and wash water into the bed at or near its base and an outlet for wash water above the top of the bed and in this apparatus the outlet is surrounded by a baffle that is below the level of the outlet and that comprises one or more upwardly inclined elements that deflect upwardly rising granular material away from the outlet and the baffle includes one or more apertures through which may fall granular material that has risen above the element or elements but which is constructed substantially to prevent the upward passage of entrained granular material. Thus the element or elements deflect granular material that is being carried upwardly by air bubbles away from the outlet and includes apertures that permit any granular material that has risen through or around the element or elements to fall back onto the bed.

Preferably the baffle comprises two upwardly inclined elements with the outer (measured from the outlet) element positioned to receive bubbles and/or granular material deflected outwardly and upwardly by the inner element and with the inner edge of the outer element being at a position that is above the outer edge of the inner element and is closer to the outlet than the outer edge of the inner element. Upward passage of granular material and/or bubbles between the outlet and the baffle must be prevented. Generally the baffle includes an element (the lower element if there are two) connected at its inner edge to the outlet. In another construction this element extends below the bottom of the outlet and is within the projected area of the base of the outlet, often defining an aperture between the element and the base of the outlet through which downwardly falling granules can fall without substantial upward movement of air bubbles or granules.

The baffle may also include other elements, and in particular may include an air separation element that generally extends from the outer edge of the outer element, generally in a substantially horizontal manner. This air separation element may be a perforated plate through which air bubbles may pass. The size of the perforations is preferably such as to prevent or minimise the upward passage of entrained granular material. The size of the perforations is preferably such as to cause separation of granular material from the air bubbles and to prevent or minimise the upward passage of the granular material.

The outlet opening is preferably an overflow, or a horizontal outlet, and may be the top edges of a cup or trough from which an outlet duct may lead out of the apparatus. If the outlet is a cup the baffle may be annular around the cup and each element may also be annular. If the outlet is a trough then a baffle as described above will generally be provided along each side of the trough. The trough itself may be annular. If the outlet is an overflow in a side wall of the bed the baffle is provided adjacent the overflow. There may be one or more troughs or other outlets. An outlet may serve as an inlet for service flow of water to be filtered.

The wash water and air scour are preferably introduced into the bed at or near the base of the bed through separate orifices. The provision of a separate air system permits proper control of the air bubble size so that the bubbles may be larger and more buoyant relative to the size and density of the filter medium grains than is attainable if a combined air-water feed system is used.

The water distribution orifices may be of conventional construction and may be in a plate that extends across the surface area of the bed or may be in laterals extending from a header, all in conventional manner. The orifices may be in the bed at or near its base or may be in a plate support on which the bed is supported or may be in or at the base of an under bed of coarse granular material on which the filter bed is supported. The orifices may serve as collectors for filtrate during service flow.

The air distribution orifices are preferably offset from the water distribution orifices in both horizontal directions so as to minimise the risk of fissuring of the bed. Preferably the air distribution orifices are positioned substantially mid-way between the water distribution orifices. The air distribution orifices are preferably above the water orifices. If the water distribution orifices are in an underbed the air distribution orifices are preferably just above the underbed.

Referring to the drawings, the filter vessel 1 may be open or closed at the top and may be cylindrical or rectangular and may be of conventional dimensions and is provided with an inlet 2 and an outlet 3 for the water being filtered during service flow and an inlet 4 and an outlet duct 5 for back wash water. Inlet 2 may be common with outlet duct 5 and inlet 4 may be common with outlet duct 3.

A plate 6 is provided for supporting an underbed 7a, which is supported a filter bed 7, above a chamber 8. The plate 6 may be of conventional construction and may be provided with orifices, illustrated diagrammatically as 9, for the upflow of back wash water that enters the chamber 8 through inlet 4 and for the collection of downflow filtrate during service flow. Alternatively a header and laterals may be provided. The orifices 9 are preferably uniformly distributed throughout the surface area of the plate 6.

An air distribution manifold 10, having an inlet 11 for pressurised air, is provided above the plate 6 and underbed 7a and includes orifices, shown diagrammatically as 12, distributed throughout its area. The manifold 10 may be of conventional type, for example a header with lateral pipes. The orifices 12 are positioned mid-way between the orifices 9 in both horizontal directions.

The outlet for back wash water is defined by the upper edges 13 of a trough 14, and the outlet duct 5 leads from this trough. Inlet duct 2, if different from outlet 5, may also be connected to the trough. The distance between the top of the bed 7 and the edges 13 of the trough define the free water space 15. In the apparatus shown the trough 14 takes the form of a suspended channel that is shown end on in FIG. 1. It has side walls 16 and base wall 17 and is provided with baffle that extends along both sides. This baffle consists on each side of a trough of inner and outer annular, upwardly inclined, elements 18 and 19 and a horizontal perforated element 20. The outer edge 21 of each inner element 18 is further from the outlet (measured horizontally) than the inner edge 22 of each element 19 and is below that edge, thereby defining an aperture 23. There is a downwardly inclined deflector plate 24 having an upper edge 25 and connecting each outer edge 21 to the adjacent wall 16. The upper edges 25 of elements 24 are below the lower edges 22 of elements 19 and preferably in line with the projection of 19.

During use granular material from the bed 7 is entrained by air bubbles and some of it is carried, or capable of being carried, to the top of the free space 15. Entrained granules striking the elements 18 or 19 roll upwardly to the underside of a perforated plate 20, which typically has at least 40% and preferably 60 to 80% perforated open area. The air bubbles pass through the openings while the filter grains tend to fall back to the bed.

Entrained grains that are carried to the top of the space 15 beyond the extremities of an element 20, i.e. near to the edges of the vessel 1, will tend to be released from their entraining air when they reach the surface and will either fall back from the surface or will be carried, with some air, towards the edge 13. The horizontal projection of the elements 18, 19 and 20 is selected such that any grains that are flowing towards the edge 13 will fall below the level of the edge 13 before they reach the wall 16. These grains will then fall down onto the baffle and be directed through an aperture 23 by a deflector plate 24, and back onto the filter bed.

Figure 2:
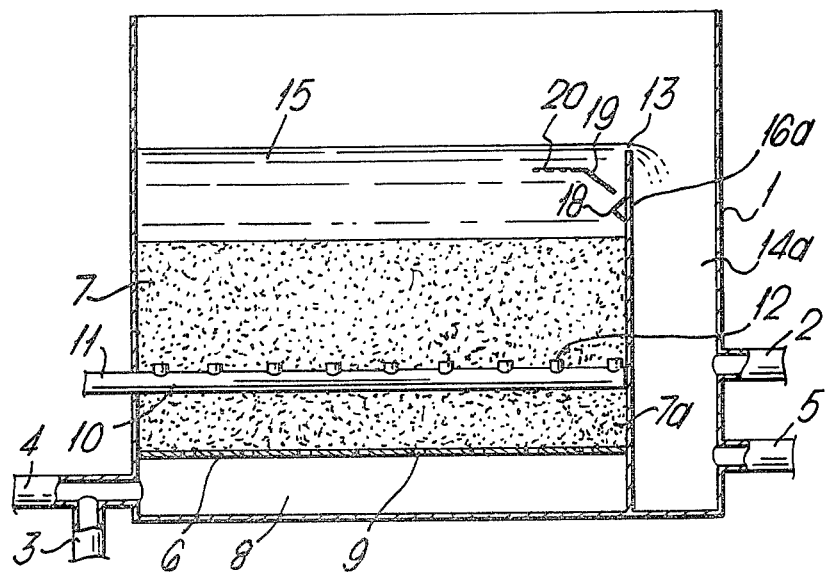
Figure 3:
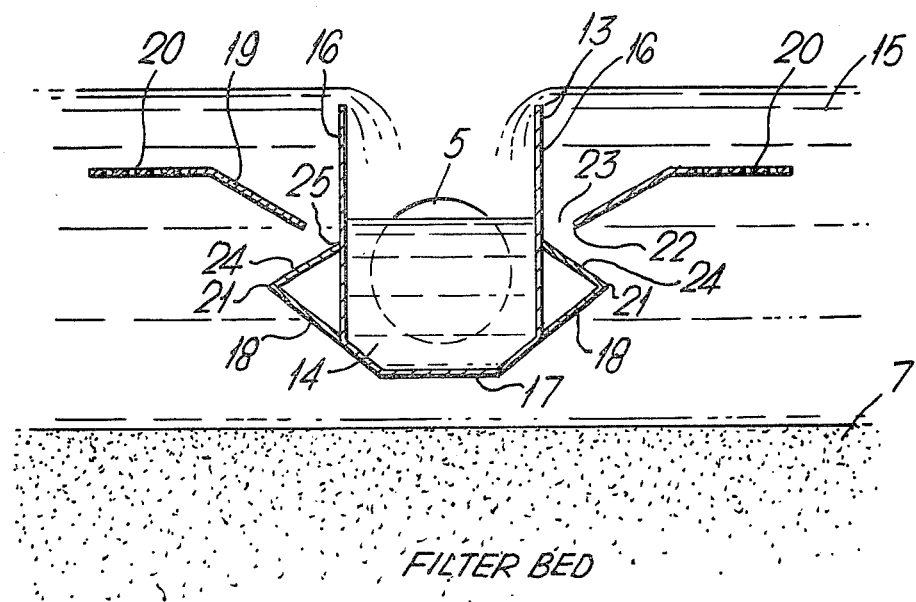
FIG. 3 is an enlargement of the upper part of the filter vessel shown in FIG. 1.

In the construction shown in FIG. 2 the outlet is the overflow over the top edge 13 of a side wall 16a of the free space above the bed 7. Back wash water flows over the edge 13 into a trough shaped chamber 14a, and out through outlet duct 5.

The described apparatus is of value in any process in which a filter bed of granular material is back washed and subjected to air upflow such that granular material is entrained by upflowing air bubbles, preferably without fluidisation of the bed. It is of particular value in a process in which washing is conducted in three stages each stage following the previous stage without interruption, the first stage involving back washing with water alone, the second back washing with water and air upflow and the third with water alone.

In the first stage the filter is back washed with water alone at a rate of or above Vf where Vf is the volume of back wash stream per unit area of bed per hour that provides minimum fluidisation when the stream consists of water. Thus Vf is the velocity at which with increasing back wash rate the head loss across the filter bed just reaches a constant value and ceases to increase with increasing back wash rate. Preferably, in the first stage the rate is Vf. The effect of this first stage is to decompact the bed preferably without significant fluidisation of the bed.

In the second stage the decompacted bed is back washed with combined streams of air and water, each of the streams being at a rate of 0.5 to 0.9 Vf. Generally the wash water rate is 0.6 to 0.8 Vf, most preferably about 0.75 Vf, and preferably the rate of flow of air by volume is substantially the same as the rate of flow by volume of water. Thus in the preferred system the linear velocity of combined air and wash water through the bed is approximately equal to the linear velocity that would be achieved with water alone at 1.5 times the minimum fluidisation velocity. Under these conditions it is possible to arrange that the air bubbles leaving the air distribution system and entering the bed are of sufficient size and buoyancy to displace the filter grains and the grains will remain in intimate contact with each other but will move relative to each other. As a result dirt adhering to the grains will rapidly be separated from the grains and carried up into the free space at the top of the bed. The bed itself however preferably is not significantly expanded and in particular preferably is not fluidised at this stage.

The second stage should follow direct from the first, while the bed is still decompacted, and likewise the third stage should follow direct from the second stage without interruption. The third stage involves deaerating the bed by back washing with a stream of water at a rate of at least 0.5 Vf and generally below 0.9 Vf. Typically the transition from the second stage to the third stage is effected merely by cutting off the air flow and continuing the water flow at the same rate as in the second stage. Air contained within the filter bed is displaced from the bed, ready for subsequent service use of the bed.

Since the vessel, during service flow, will normally be filled with water up to the level above 13 it is necessary to lower the level of water substantially to the level of the outlet 13 before starting the cleaning operation.

A separate feature of the invention resides in a method and apparatus for back washing a filter bed of granular material with water introduced into the bed at or near its base through water supply orifices while air scouring the bed with air introduced separately into the bed at or near its base by separate air supply orifices, and in which the air and water supply rates are such that fissuring of the bed would occur if the air supply orifices are above the water supply orifices and fissuring is prevented by providing the air supply orifices offset from the water distribution orifices, preferably in both horizontal directions.

I claim:

1. A method in which liquid is filtered through a filter bed of granular material in a vessel and a filter bed is cleaned in a vessel, by simultaneous upflow of wash water and air bubbles; said vessel having an outlet for wash water above the top of the bed, a free water space below the level of the outlet, and at least one baffle in said free water space adjacent to each side of said outlet, each said baffle comprising inner and outer baffle elements inclined upwardly and away from the outlet, an aperture defined by and between the inner and outer baffle elements and an air separation element, said inner element being nearer to said outlet than said outer element, said inner baffle element being positioned to prevent upflow of air through said aperture, said outer element comprising inner and outer edges and said air separation element comprising a substantially horizontal perforated plate extending from said outer edge of said outer element in a direction away from said outlet; wherein the steps of cleaning comprise upflowing water and air through the bed such that some granular material is entrained by upflowing air bubbles, deflecting entrained granular material adjacent said outlet away from the outlet by said at least one baffle, separating substantially all the entrained granular material from the bubbles adjacent the top of the said water space, separating at least part of the entrained granular material at said perforated plate through which air bubbles may rise but through which the passage of entrained granular material is minimized, and passing any granular material that rises above said at least one baffle down through said aperture, with the separated granular material falling back onto the baffle.

2. A method in which a liquid is filtered through a filter bed of granular material in a vessel and the filter bed is cleaned in the vessel, by simultaneous upflow of wash water and air bubbles; said vessel having an outlet for wash water above the top of the bed, a free water space below the level of the outlet, and at least one baffle in said free water space adjacent to each side of said outlet, each said baffle comprising inner and outer baffle elements inclined upwardly and away from the outlet, at least one aperture defined by and between said baffle elements and said inner baffle element positioned to prevent upflow of water through said aperture; wherein the steps of cleaning comprise upflowing water and air through the bed such that some granular material is entrained by upflowing air bubbles, deflecting entrained granular material adjacent said outlet away from the outlet by said at least one baffle, separating substantially all the entrained granular material from the bubbles at or near the top of said free water space, and passing any granular material that rises above said at least one baffle down through said at least one aperture with the separated granular material falling back onto the bed.

3. A method according to claim 2 in which said inner element is nearer to said outlet than said outer element and said aperture is defined between the inner and outer elements.

4. A method according to claim 2 further comprising separating at least part of the entrained granular material with an air separation element, said inner element is nearer to said outlet than said outer element, said aperture is defined between said inner and outer baffle elements, said outer element comprising inner and outer edges and said air separation element comprising a perforated plate extending from said outer edge of said outer element in a direction away from said outlet, and in which air bubbles rise through the perforations in said perforated plate and the passage of entrained granular material through the plate is minimized.

5. A method according to claim 2 further comprising introducing the wash water and air into the bed adjacent to the base of the bed through means defining separate orifices.

6. A method according to claim 2 further comprising introducing the wash water and air into the bed adjacent the base of the bed through means defining separate orifices and in which the orifices for distribution of air are offset from the orifices for distribution of water along both horizontal axes.

7. A method according to claim 2 further comprising introducing the wash water and air into the bed adjacent the base of the bed through means defining separate orifices and in which the orifices for distribution of air are positioned above the orifices for distribution of water.

8. Filtration apparatus comprising a vessel in which a filter bed of granular material is contained, inlets for introducing air and wash water into the bed adjacent to its base, an outlet for wash water above the top of the bed and a baffle on each side of said outlet, said baffle comprising inner and outer baffle elements inclined upwardly and away from the outlet to deflect rising granular material entrained by air away from said outlet, at least one aperture defined by and between said baffle elements, through which may fall granular material that has risen above said elements, and said inner baffle element positioned to prevent the upward passage of air or entrained granular material through said at least one aperture.

9. Apparatus according to claim 8 in which said inner elements are nearer to said outlet than said outer elements and each element having inner and outer edges, wherein said outer element is positioned to receive rising air bubbles and entrained granular material deflected outwardly by said inner elements and the inner edge of the outer element is positioned above the outer edge of the inner element and nearer to the outlet than the outer edge of the inner element.

10. Apparatus according to claim 8 further comprising an air separation element, said inner element is nearer to said outlet than said outer element and each element having inner and outer edges, wherein said outer element is positioned to receive air bubbles and entrained granular material deflected outwardly by said inner element, the inner edge of the outer element is positioned above the outer edge of the inner element and nearer to the outlet than the outer edge of the inner element and said air separation element is a perforated plate extending from said outer edge of said outer element in a direction away from said outlet through which air bubbles may pass but through which the outward passage of entrained granular material is minimized.

11. Apparatus according to claim 8, including adjacent to the base of the bed means defining orifices for introducing the wash water and means defining separate orifices for introducing the air.

12. Apparatus according to claim 8, including adjacent to the base of the bed means defining orifices for introducing the wash water and means defining separate orifices for introducing air and in which the orifices for distributing the air are offset along both horizontal axes from the orifices for distributing the water.

13. Apparatus according to claim 8, including adjacent to the base of the bed means defining a set of orifices for introducing the wash water and means defining a separate set of orifices for introducing the air and in which the sets of orifices are offset from one another so that the orifices for distributing the air are positioned substantially midway between the orifices for distributing the water.

14. Apparatus according to claim 8, including adjacent to the base of the bed means defining orifices for introducing the wash water and means defining separate orifices for introducing the air and in which the orifices for distributing the air are positioned above the orifices for distributing the water.

15. Apparatus comprising a vessel in which a filter bed of granular material is contained, inlets for introducing air and wash water into the bed adjacent to its base, an outlet for wash water above the top of the bed and a baffle on each side of said outlet, said baffle comprising inclined inner and outer baffle elements, and an air separation element, an aperture defined by and between said inner and outer baffle elements, said baffle elements are positioned to deflect rising granular material entrained by air away from said outlet, said inner baffle element being nearer to said outlet than said outer baffle element and each baffle element having inner and outer edges, wherein said outer baffle element is positioned to receive rising air bubbles and entrained granular material deflected outwardly by said inner baffle element and the inner edge of the outer baffle element is positioned above the outer edge of the inner baffle element and nearer to the outlet than the outer edge of the inner baffle element so as to allow the downward passage of granular material through said aperture, and wherein the air separation element extends from the outer edge of the outer baffle element in a direction away from said outlet and comprises a substantially horizontal perforated plate through which air bubbles may pass, but through which the upward passage of granular material is minimized.

* * * * *